(12) United States Patent
Baldwin et al.

(10) Patent No.: US 10,592,415 B2
(45) Date of Patent: Mar. 17, 2020

(54) MODIFIED CONSISTENCY HASHING RINGS FOR OBJECT STORE CONTROLLED WAN CACHE INFRASTRUCTURE

(71) Applicant: INTERNATIONAL BUSINESS MACHINES CORPORATION, Armonk, NY (US)

(72) Inventors: Duane Baldwin, Mantorville, MN (US); Sasikanth Eda, Vijayawada (IN); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/829,577

(22) Filed: Dec. 1, 2017

(65) Prior Publication Data
US 2019/0171570 A1 Jun. 6, 2019

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/0862* | (2016.01) | |
| *G06F 12/0895* | (2016.01) | |
| *G06F 16/172* | (2019.01) | |
| *H04L 29/08* | (2006.01) | |
| *H04L 12/28* | (2006.01) | |

(52) U.S. Cl.
CPC ...... *G06F 12/0862* (2013.01); *G06F 12/0895* (2013.01); *G06F 16/172* (2019.01); *G06F 2212/1021* (2013.01); *G06F 2212/154* (2013.01); *G06F 2212/6026* (2013.01); *H04L 12/2854* (2013.01); *H04L 67/104* (2013.01); *H04L 67/2847* (2013.01)

(58) Field of Classification Search
CPC .............. G06F 12/0862; G06F 16/172; G06F 2212/6026
USPC ........................................................ 711/137
See application file for complete search history.

(56) References Cited

U.S. PATENT DOCUMENTS

| | | |
|---|---|---|
| 8,352,597 B1 | 1/2013 | Jenny et al. |
| 8,370,452 B2 | 2/2013 | Harvell et al. |

(Continued)

OTHER PUBLICATIONS

IHONG5, "Modified Consistent Hashing Rings in OpenStack Swift", Wordpress, Aug. 22, 2014, 5 Pages, Printed on Oct. 13, 2017, https://ihong5.wordpress.com/2014/08/22/modified-consistent-hashing-rings-in-openstack-swift/.

(Continued)

*Primary Examiner* — Edward J Dudek, Jr.
*Assistant Examiner* — Sidney Li
(74) *Attorney, Agent, or Firm* — Anthony M. Pallone

(57) ABSTRACT

An embodiment of the invention may include a method, computer program product and system for optimizing a wide area network caching infrastructure in a file based object storage architecture. The embodiment may include creating, by a parent partition, a heat map. The embodiment may include prioritizing prefetching by multiple dependent partitions based on the heat map. In response to prioritized prefetching by the multiple dependent partitions, the embodiment may include allocating wide area network caching threads. The embodiment may include providing, by the parent partition, objects for prefetching by the multiple dependent partitions utilizing the allocated wide area network caching threads.

17 Claims, 5 Drawing Sheets

(56) References Cited

U.S. PATENT DOCUMENTS

| | | | |
|---|---|---|---|
| 8,549,108 B2 | 10/2013 | Kini et al. | |
| 8,612,668 B2 | 12/2013 | Nishimoto et al. | |
| 8,825,789 B2 | 9/2014 | Muntz | |
| 2007/0162462 A1 | 7/2007 | Zhang et al. | |
| 2008/0201341 A1* | 8/2008 | Okamoto | H04N 21/2312 |
| 2009/0222584 A1* | 9/2009 | Josefsberg | H04L 29/12066 |
| | | | 709/245 |
| 2010/0274772 A1* | 10/2010 | Samuels | G06F 16/1748 |
| | | | 707/693 |
| 2011/0161291 A1 | 6/2011 | Taleck et al. | |
| 2014/0067988 A1 | 3/2014 | Noronha et al. | |
| 2016/0048551 A1 | 2/2016 | Baldwin et al. | |
| 2017/0061364 A1* | 3/2017 | Waltz | G06F 16/2453 |

OTHER PUBLICATIONS

IBM, "Hadoop Support for IBM Spectrum Scale", Printed on Oct. 13, 2017, 3 Pages, https://www.ibm.com/support/knowledgecenter/en/STXKQY_4.2.1/com.ibm.spectrum.scale.v4r21.doc/bl1adv_hadoop.htm.

Mell et al., "The NIST Definition of Cloud Computing", NIST, Sep. 2011, 7 Pages, Special Publication 800-145, U.S. Department of Commerce, Gaithersburg, MD.

Lu, "Optimizing Virtual Machine I/O Performance in Cloud Environments", Virginia Commonwealth University, VCU Scholars Compass, 2016, 125 Pages, http://scholarscompass.vcu.edu/etd/4640.

IBM, "Active File Management (AFM)", Printed on Dec. 1, 2017, 3 Pages, https://www.ibm.com/developerworks/community/wikis/home?lang=en#.

* cited by examiner

MODIFIED CONSISTENCY HASHING RINGS FOR OBJECT STORE CONTROLLED WAN CACHE INFRASTRUCTURE

BACKGROUND

The present invention relates, generally, to the field of data storage, and more specifically, to optimizing object-based ("object") storage within a wide area network ("WAN") cache infrastructure.

Object storage is a computer data storage architecture that manages data as objects, as opposed to other storage architectures such as file systems and block storage. In an object storage architecture, each object typically includes the data, a variable amount of metadata, and a unique identifier. Object storage may be implemented at the device level, the system level, and the interface level. Object storage seeks to enable capabilities not addressed by other storage architectures, for example, APIs that may be directly programmable by an application manipulating data, a namespace that may span multiple physical devices, and data management functions such as data replication and data distribution.

BRIEF SUMMARY

An embodiment of the invention may include a method, computer program product and system for optimizing a wide area network caching infrastructure in a file based object storage architecture. The embodiment may include creating, by a parent partition, a heat map. The embodiment may include prioritizing prefetching by multiple dependent partitions based on the heat map. In response to prioritized prefetching by the multiple dependent partitions, the embodiment may include allocating wide area network caching threads. The embodiment may include providing, by the parent partition, objects for prefetching by the multiple dependent partitions utilizing the allocated wide area network caching threads.

DETAILED DESCRIPTION

Figure 1:
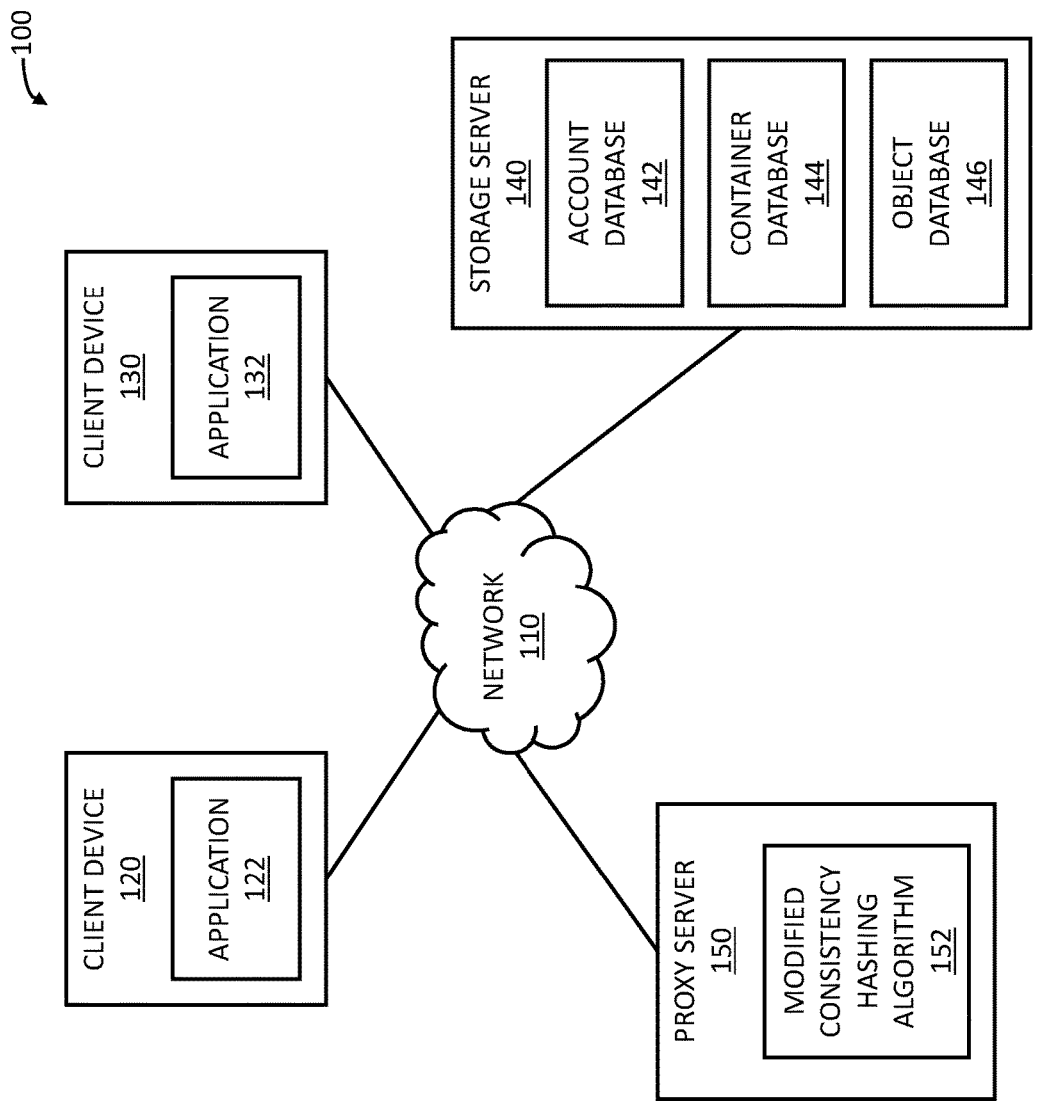
FIG. 1 is a block diagram illustrating a wide area network ("WAN") cache optimizing system, in accordance with an embodiment of the present invention.

Object Storage may be used for redundant, scalable data storage using clusters of standardized servers to store large amounts of accessible data. It is a long-term storage system for large amounts of static data which can be retrieved and updated. Object Storage uses a distributed architecture with no central point of control, providing greater scalability, redundancy, and permanence. Objects are written to multiple hardware devices, with software responsible for ensuring data replication and integrity across the cluster. Storage clusters scale horizontally by adding new nodes. Should a node fail, clusters work to replicate the content of the failed node from other active nodes. Since software logic may be used to ensure data replication and distribution across different devices, inexpensive commodity hard drives and servers can be used in place of more expensive equipment. Object Storage is ideal for cost effective, scale-out storage. It provides a fully distributed, API-accessible storage platform that can be integrated directly into applications or used for backup, archiving, and data retention. Object storage may utilize the following components: proxy servers; rings; zones; accounts and containers; object servers; and partitions.

Proxy servers are the public face of an object storage architecture and handle all of the incoming API requests. For each request, a proxy server will look up the location of the account, container, or object in the ring and route the request accordingly. A proxy server may determine the storage node based on an object's URL. Proxy servers also coordinate responses, handle failures, and coordinate timestamps. Proxy servers use a shared-nothing architecture and can be scaled as needed based on workloads. If one proxy server fails, the others take over. The public API is also exposed through the Proxy Server. When objects are streamed to or from storage, they are streamed directly through the proxy server to or from the user.

A ring represents a data structure which serves as a mapping between the names of entities (e.g., objects) stored in the cluster and their physical locations on disks. There are separate rings for accounts, containers, and objects. When components of an object storage system need to perform an operation on an object, container, or account, they need to interact with the corresponding ring to determine the appropriate location in the cluster. The ring maintains this mapping using zones, devices, partitions, and replicas. The ring may be used by proxy servers and several background processes, such as, replication. Each partition in the ring is replicated across the cluster, and partition locations are stored in the mapping maintained by the ring. The ring is also responsible for determining which devices are used as handoffs in failure scenarios. Data may be isolated into zones in the ring. Each partition replica may reside in a different zone. The ring uses a configurable number of bits, from an MD5 hash for a path, as a partition index that designates a device (e.g., disk). For example, for every incoming object, the MD5 hash of its path is calculated. The hex decimal from the resulting hash is converted to an integer value. Modulus is then calculated using the obtained integer value and the number of drives participating in the cluster. Based on the obtained modulus value, the appropriate partition/disk is selected for storing the object. The preceding example is an illustration of a modified consistency hashing algorithm. The algorithm may also apply other factors such as, replication, zone, and weight to influence the partition/disk to be designated for storing a particular object. Furthermore, other object storage architecture features such as, replication, migration, and health checker may use the storage path determined by the ring as a reference to decide the placement/movement of data.

Each account and container may be an individual database that is replicated and distributed across the cluster. An account database contains the list of containers in that account. A container database contains the list of objects in that container.

The Object Server may be a blob storage server that can store, retrieve and delete objects stored on local devices. Objects are stored as binary files on the filesystem with metadata stored in the file's extended attributes ("xattrs").

All objects stored in an object storage architecture have a URL and their own metadata. Each object is stored using a path derived from the object name's hash and the operation's timestamp. Last write always wins, and ensures that the latest object version will be served. A deletion is also treated as a version of the file. This ensures that deleted files are replicated correctly and older versions don't reappear due to failure scenarios.

A partition is a collection of stored data with a corresponding hash table of what it contains. This includes account databases, container databases, and objects. Replications and object uploads/downloads operate on partitions. An object storage architecture may implement partitions, with each having a fixed width, which may be assigned to drives in the cluster using the MD5 hash discussed above. The number of bits kept from the MD5 hash is known as the partition power, and 2 to the partition power indicates the partition count. As the object storage system scales up, its behavior continues to be predictable because the number of partitions is a fixed number.

Currently, in enterprise level object storage, there exists a requirement for a scenario in which object data can be sent from multiple satellite sites to a central storage, or vice versa. Object data from multiple satellite sites is stored in a central storage in order to reduce storage requirements at the satellite sites. In addition, the sent object data should be able to be recalled from central storage to its respective satellite location. The time required for object data recall typically depends on network speed, object size, and the number of parallel network file system ("PNFS") threads working to perform operations such as LAYOUT_GET, READ, WRITE, and LAY_OUT COMMIT. However, current wide area network ("WAN") caching solutions, an example of which is described below, do not assist in optimizing, in terms of speed within allocated resources, the just described scenario for an object workload.

Active file management ("AFM") is a scalable, high-performance, file system caching layer integrated with the GPFS™ cluster file system. AFM automates the management of data by creating associations from a local GPFS cluster to a remote cluster or storage and defining the location and flow of file data. This allows for implementation of a single namespace view across sites around the world. AFM masks wide-area network latencies and outages by using GPFS and WAN caching to cache massive data sets, allowing data access and modifications even when a remote storage cluster is unavailable. In addition, AFM performs updates to the remote cluster asynchronously, which allows applications to continue operating while not being constrained by limited outgoing network bandwidth.

Wide Area Network caching fetches complete files on demand from a home file set to a remote system cache in real time during normal operation. The prefetching feature moves files into the cache in batch mode so that they are already present in the cache when they are accessed by an application. The prefetching of cache before an application is started can reduce the network delay when the application starts. A cache file set has a relationship with a data source which is called the home.

WAN caching may operate in several modes, such as read-only, local update, single-writer, and independent-writer. Independent-writer mode allows both reads and writes, it pushes changes to home and checks home for file updates. Data comes from home into an independent-writer cache when requested, by opening the file or issuing the prefetch command. Data written directly into an independent-writer file set is pushed to home as quickly as possible. If a file already exists in the cache file set it is checked with the version at home when the file is opened to ensure the request gets the latest version. If the home contains the latest version the independent writer cache copies the changes into the cache.

In a scenario where there exists two satellite sites, each with their own partitions, linked to a central storage, it may be the case that there exists some common objects between the two satellite sites or it may be the case where objects ingested via one site are needed at the other site (dependent site/partition). Relationships between partitions may be identified/determined by the ring data structure or by a database (central or shared across two sites). In either of these cases, the current day WAN caching solution does not support object relationships (parent partition/dependent partition) with respect to the satellite sites and fails to prefetch objects to the dependent partition based on the heat map generated by the parent partition. A heat map may be a file, or a record in a time series controlled database, which maintains an access count (frequency of access) for each file within a namespace. For example, within a database, a heat map may be represented by two columns; a filename column and an access count column. Furthermore, in the same scenario, the WAN caching threads may be configured globally across each site. Traditionally, WAN caching threads act sequentially based on the user operations performed. However, WAN caching threads lack intelligence to dynamically increase the number of threads working towards prefetching objects which are needed for a specific dependent partition, respective to one of the two sites, based on the heat map generated by the parent partition. This lack of intelligence to prefetch objects for dependent partitions based on the heat map generated by the parent partition leaves scope for WAN caching optimization when applied to multi-site object storage enabled environments.

Embodiments of the present invention may include a framework that: enables identification of relationships (e.g., parent/dependent partition relationships) across partitions spread across multiple sites/clusters; enables the pre-fetch of objects by dependent partitions based on a heat map generated by parent partitions; and dynamically manages WAN caching threads to prioritize pre-fetches in situations where multiple dependent partitions pre-fetch objects in an object storage system.

The proposed invention may provide the following features and flexibility in a traditional multi-site object storage architecture. The feature of enabling partition specific monitoring for partitions mapped according to a modified consistency hashing algorithm. The partition specific monitoring may keep track of the number of objects within each partition, the number of times each object is requested for either GET/PUT/POST commands, and prepares a list of objects in descending order (i.e., highly accessed object is stored as first element in the list). The partition specific monitoring may also be extended to enable peer communications which may identify partitions that contain a maximum number of changes and prepare a list of partitions in descending order (i.e., partitions that contain highest changes are stored as first element in the list). The feature of establishing relationships between the partitions, which are WAN caching enabled, may be implemented manually or automatically. In the manual implementation, the WAN caching prefetch is always configured manually between the user identified parent and dependent partitions. Whereas, in the automatic implementation, the proposed framework may keep track of recall patterns of objects per site, per partition and accordingly configure the prefetch of objects between the partitions. Lastly, the feature of dynamically increasing or decreasing the number of PNFS threads working per partition. The increase or decrease of PNFS threads may fall within a specified WAN caching thread limit set at cluster or namespace level. The number of threads that need to be utilized for a partition is dependent on the heat map generated by a parent partition (i.e., depends on number of objects per partition).

Embodiments of the present invention will now be described in detail with reference to the accompanying Figures.

FIG. 1 is a functional block diagram illustrating WAN cache optimizing system 100, in accordance with an embodiment of the present invention. In an example embodiment, WAN cache optimizing system 100 may include client device 120, client device 130, storage server 140, and proxy server 140, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between client computer 120, backend storage 130, unified volume listing 132, and unified container volume server 140.

In an example embodiment, client device 120 may include application 122. Client device 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as client device 130 and proxy server 150, via network 110, and capable of supporting the functionality required of embodiments of the invention. While client device 120 is shown as a single device, in other embodiments, client device 120 may be comprised of a cluster or plurality of computing devices, working together or working separately. Client device 120 may be described generally with respect to FIG. 3 below.

In an example embodiment, application 122 may be a program, or subroutine contained in a program, that may operate to access data centrally stored within storage server 140. Application 122 may result from any commercially available, open source, or proprietary software that access a remote storage device to retrieve and store data, in accordance with embodiments of the invention. In an example embodiment, application 122 may communicate, via network 110, with proxy server 150 in order to access data stored within object database 142, located on storage server 140.

In an example embodiment, client device 130 may include application 132. Client device 130 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as client device 120 and proxy server 150, via network 110, and capable of supporting the functionality required of embodiments of the invention. While client device 130 is shown as a single device, in other embodiments, client device 130 may be comprised of a cluster or plurality of computing devices, working together or working separately. Client device 130 may be described generally with respect to FIG. 3 below.

In an example embodiment, application 132 may be a program, or subroutine contained in a program, that may operate to access data centrally stored within storage server 140. Application 132 may result from any commercially available, open source, or proprietary software that access a remote storage device to retrieve and store data, in accordance with embodiments of the invention. In an example embodiment, application 132 may communicate, via network 110, with proxy server 150 in order to access data stored within object database 142, located on storage server 140.

In an example embodiment, storage server 140 may include account database 142, container database 144, and object database 146. Storage server 140 may be a desktop computer, a notebook, a laptop computer, a blade server, a networked computer appliance, a virtual device, a thin client, or any other networked electronic device or computing system capable of receiving and sending data from and to other computing devices such as proxy server 150, via network 110, and capable of supporting the functionality required of embodiments of the invention. In an example embodiment, storage server 140 may organize data into a hierarchy of databases as follows: account database 142, container database 144, and object database 146. Furthermore, in an example embodiment, storage server 140 may transmit and receive data objects to and from proxy server 150. While storage server 140 is shown as a single device, in other embodiments, storage server 140 may be comprised of a cluster or plurality of computing devices, working together or working separately. Storage server 140 may be described generally with respect to FIG. 3 below.

In an example embodiment, account database 142 may be a database containing a listing of containers within a specific account. Account database 142 may represent the top-level of the data hierarchy and contain a namespace for containers within WAN caching optimizing system 100. In other embodiments, account database 142 may be distributed across a cluster of computing devices.

In an example embodiment, container database 144 may be a database containing a listing of objects within a specific container. Furthermore, container database 144 may contain a namespace for objects within WAN caching optimizing system 100. In other embodiments, account database 142 may be distributed across a cluster of computing devices.

In an example embodiment, object database 146 may be a database containing object data such as, documents, images, etc., within WAN cache optimizing system 100. Furthermore, object database 146 may also contain metadata associated with the stored object data. In an example embodiment, objects may be stored as binary files with associated metadata stored in the file's extended attributes. Each object may be stored using a path derived from the object name's hash and an operator's timestamp.

In an example embodiment, proxy server 150 may include modified consistency hashing algorithm 152. Proxy server 150 may be a desktop computer, a notebook, a laptop computer, a blade server, a networked computer appliance, a virtual device, a thin client, or any other networked electronic device or computing system capable of receiving and sending data from and to other computing devices such as client device 120, client device 130, and storage server 140, via network 110, and capable of supporting the functionality required of embodiments of the invention. While proxy server 150 is shown as a single device, in other embodiments, proxy server 150 may be comprised of a cluster or plurality of computing devices, working together or working separately. Proxy server 150 may be described generally with respect to FIG. 3 below.

In an example embodiment, modified consistency hashing algorithm 152 may be a program, or subroutine contained in a program, that may operate to identify relationships among partitions spread across multiple devices, prefetch data based on identified relationships, and dynamically manage WAN caching threads based on identified relationships. Modified consistency hashing algorithm 152 may handle requests, received from a client device (e.g., client device 120, client device 130), to access centrally stored data objects, via network 110. In an example embodiment, modified consistency hashing algorithm 152 receives a request, from application 122, to access data stored within object database 146 and common between application 122 and application 132. Furthermore, modified consistency hashing algorithm 152 also receives a request from application 132 to access the common data. The operations and functions of modified consistency hashing algorithm 152 are described in further detail below with regard to FIG. 2.

Figure 2:
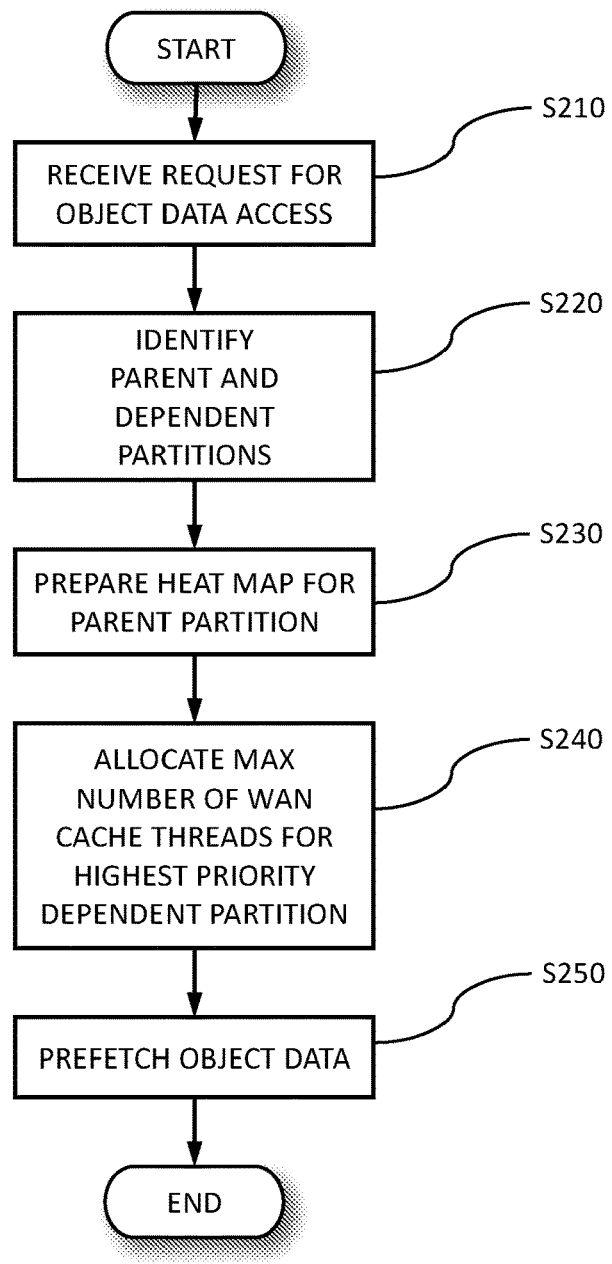
FIG. 2 is a flowchart illustrating the operations of the modified consistency hashing algorithm of FIG. 1, in accordance with an embodiment of the invention.

FIG. 2 shows a flowchart illustrating the operations of modified consistency hashing algorithm 152 in accordance with an example embodiment of the invention. Referring to step S210, modified consistency hashing algorithm 152 may receive a request, from a client device (e.g., client device 120, client device 130), to access object data stored in object database 146. A partition index is determined using MD5 hash of the object's path. In an example embodiment, modified consistency hashing algorithm 152 may receive a request, from client device 120, to recall an object stored in object database 146.

Referring to step S220, modified consistency hashing algorithm 152 may identify the WAN caching enabled parent partition and any WAN caching enabled dependent partitions corresponding to the requested object. Partition relationships may be determined manually by configuring the WAN caching prefetch between a user identified parent and dependent partitions. Partition relationships may be determined automatically by tracking the recall pattern of objects per site per partition and configuring the prefetch between the partitions accordingly. In an example embodiment, modified consistency hashing algorithm 152 identifies parent/dependent relationships across partitions, corresponding to the requested object, located in client device 120 and client device 130 by tracking the recall pattern of the requested object per site per partition.

Referring to step S230, modified consistency hashing algorithm 152 may generate a heat map for the identified parent partition. The heat map contains a listing of the objects falling under each partition in descending order from the most highly accessed object within the partition to the least accessed object within the partition. The heat map also contains a count of the number of objects within the partition. In an example embodiment, modified consistency hashing algorithm 152 generates a heat map for the parent partition identified in step S220.

Referring to step S240, modified consistency hashing algorithm 152 may dynamically and automatically increase, or decrease, the number of threads working per partition. The number of threads may be increased or decreased within a specified WAN caching thread limit set at cluster or namespace level. The number of threads needed for a dependent partition is based on the heat map generated by the parent partition (i.e., the number of threads depends on the number of objects per partition). In an example embodiment, modified consistency hashing algorithm 152 may automatically increase the number of threads needed for the dependent partition, identified in step S220, based on the heat map generated in step S230.

Referring to step S250, modified consistency hashing algorithm 152 may perform a prefetch of data objects by the dependent partition, identified in step S220, utilizing the increased number of threads allocated in step S240. "Prefetch" in this context refers to reading data from a storage device, or devices, corresponding to a dependent partition and loading the data to memory or cache on the dependent partition and pro-actively pushing the loaded data to temporary space (cache) on a parent partition. When user access the file, the data is read from this temporary space and served to a user. The amount of data to prefetch and number of worker threads to act for prefetch depends on the user configuration.

Figure 3:
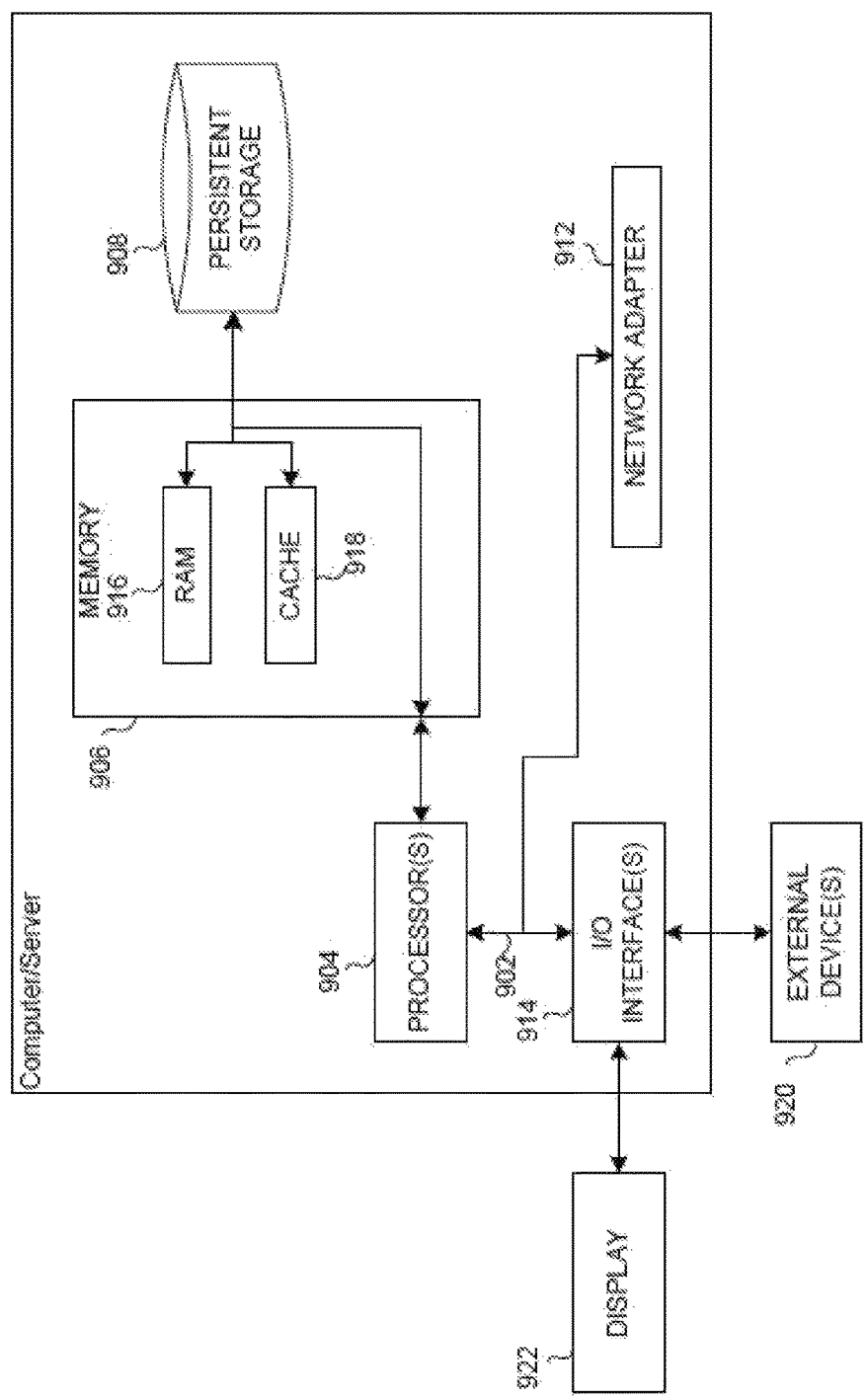
FIG. 3 is a block diagram depicting the hardware components of the WAN cache optimizing system of FIG. 1, in accordance with an embodiment of the invention.

FIG. 3 depicts a block diagram of components of client computer 120, backend storage 130, and unified container volume server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client device 120, client device 130, storage server 140, and proxy server 150 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs application 122 in client device 120; application 132 in client device 130; and modified consistency hashing algorithm 152 in proxy server 150 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs application 122 in client device 120; application 132 in client device 130; and modified consistency hashing algorithm 152 in proxy server 150 may be downloaded to persistent storage 908 through network adapter 912.

I/O interface(s) 914 allows for input and output of data with other devices that may be connected to client device 120, client device 130, storage server 140, and proxy server 150. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs application 122 in client device 120; application 132 in client device 130; and modified consistency hashing algorithm 152 in proxy server 150, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
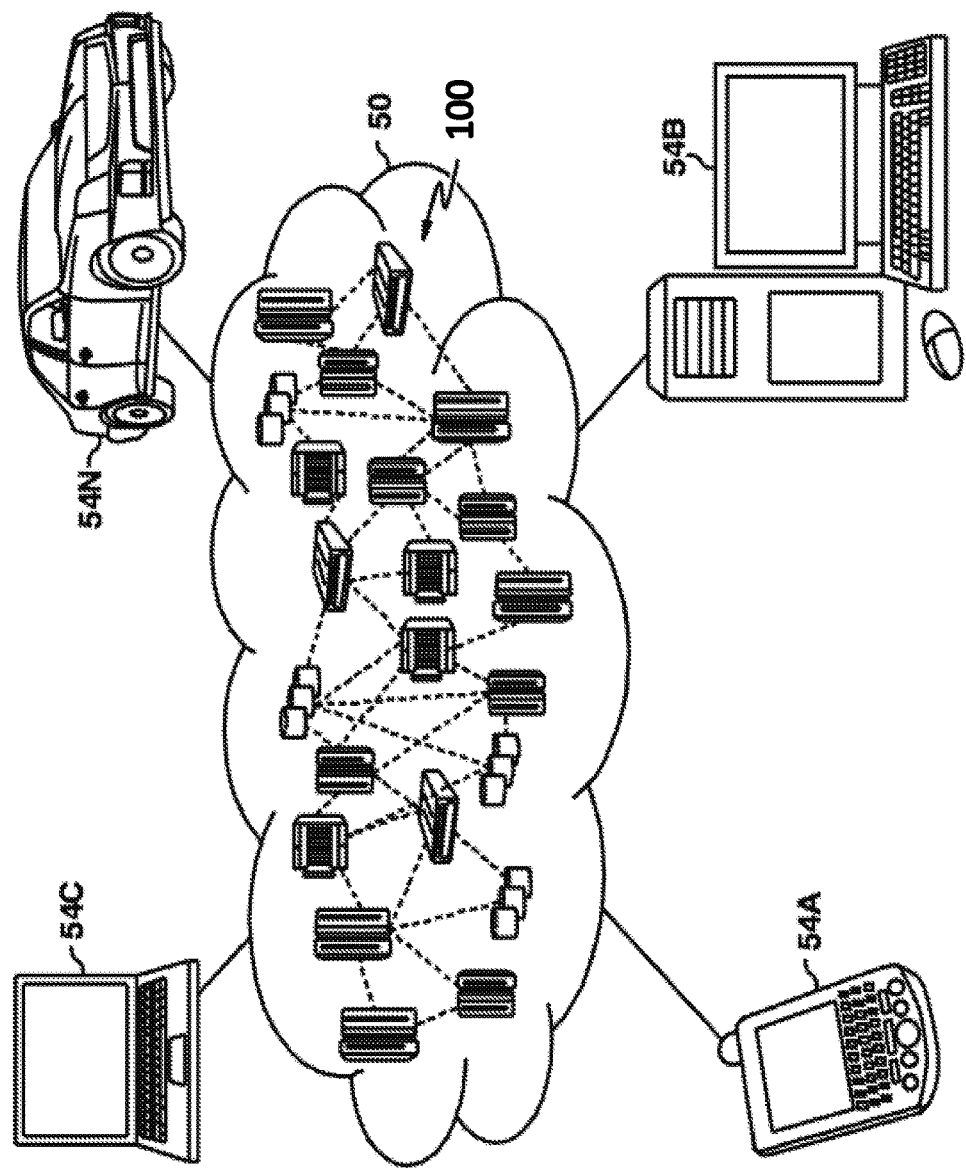
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
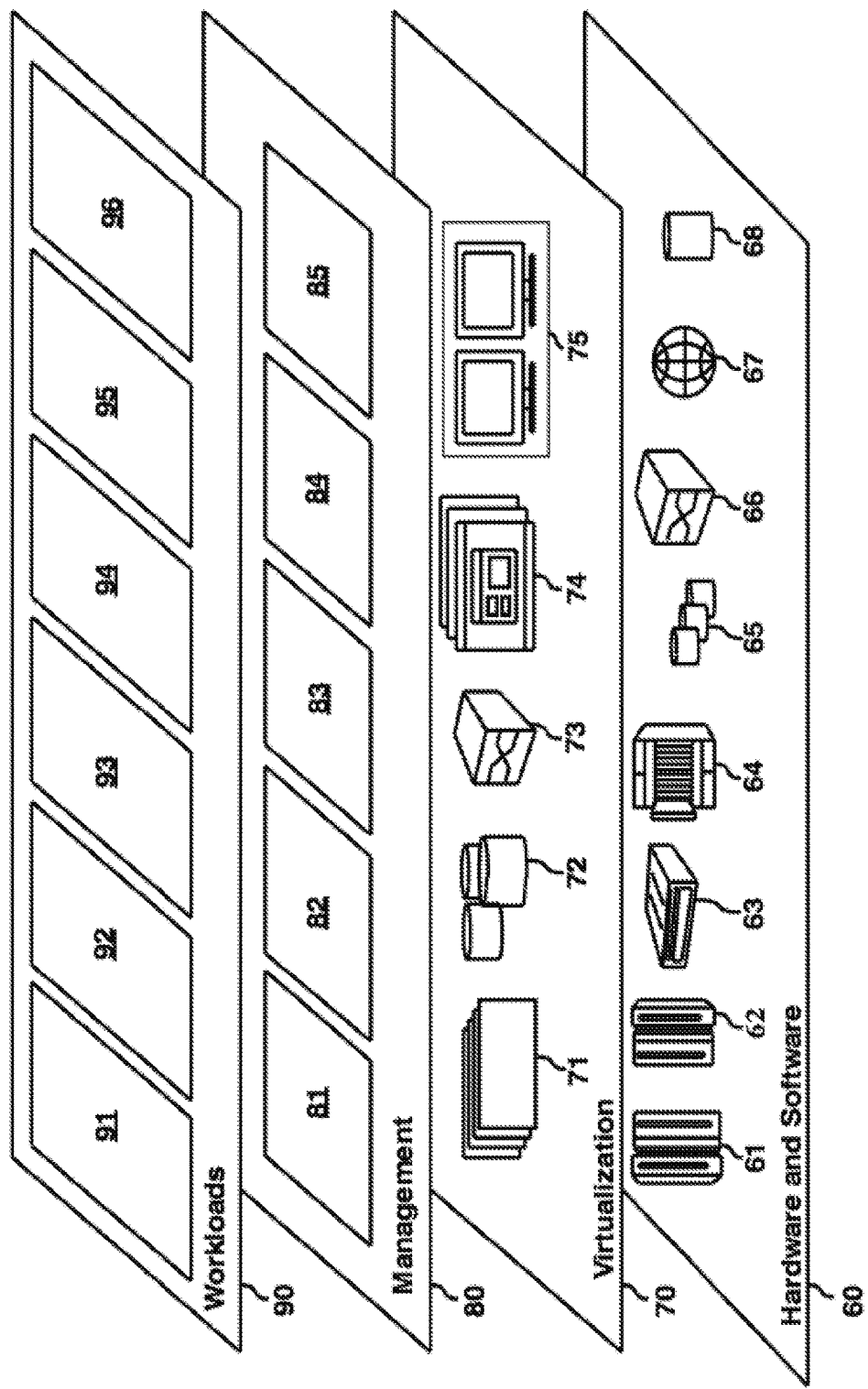
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wide area network ("WAN") cache optimizing system 96. Wide area network ("WAN") cache optimizing system 96 may relate to optimizing a wide area network caching infrastructure in a file based object storage architecture.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for optimizing a wide area network caching infrastructure in a file based object storage architecture, the method comprising:
   creating, by a parent partition, a heat map, wherein creating the heat map comprises determining a relationship between each partition of the file based object storage architecture based on a pattern of object recall per site per partition, and wherein each partition is wide area network caching enabled, and wherein the determined relationships identify the parent partition and the multiple dependent partitions;
   prioritizing prefetching by multiple dependent partitions based on the heat map;
   in response to prioritized prefetching by the multiple dependent partitions, allocating wide area network caching threads; and
   providing, by the parent partition, objects for prefetching by the multiple dependent partitions utilizing the allocated wide area network caching threads.

2. The method of claim 1, wherein creating, by the parent partition, the heat map comprises monitoring, by the parent partition, of the multiple dependent partitions.

3. The method of claim 2, wherein monitoring, by the parent partition, of the multiple dependent partitions comprises:
   logging, by the parent partition, a number of objects within each dependent partition;
   logging, by the parent partition, a number of times access is requested for each object; and
   preparing, by the parent partition, a list of objects in order of descending number of access requests, wherein the list of objects also specifies the dependent partition containing each object.

4. The method of claim 2, wherein a first dependent partition, containing a first object with a number of access requests greater than a second object contained in a second dependent partition, is given a priority over the second dependent partition, and wherein a number of threads working per dependent partition is dependent on the priority given to the dependent partition.

5. The method of claim 1, wherein allocating the wide area network caching threads comprises an element from the group consisting of increasing the number of threads working per partition and decreasing the number of threads working per partition.

6. The method of claim 1, further comprising:
monitoring individual partitions of the file based object storage architecture, the monitoring comprises:
enabling peer-to-peer communication;
identifying partitions that contain a maximum number of changes; and
preparing a list of partitions in order of descending number of changes.

7. A computer program product for optimizing a wide area network caching infrastructure in a file based object storage architecture, the computer program product comprising:
one or more computer-readable tangible storage devices and program instructions stored on at least one of the one or more computer-readable tangible storage devices, the program instructions being executable by a computer, the program instructions comprising:
program instructions to create, by a parent partition, a heat map, wherein program instructions to create the heat map comprise determining a relationship between each partition of the file based object storage architecture based on a pattern of object recall per site per partition, and wherein each partition is wide area network caching enabled, and wherein the determined relationships identify the parent partition and the multiple dependent partitions;
program instructions to prioritize prefetching by multiple dependent partitions based on the heat map;
in response to prioritized prefetching by the multiple dependent partitions, program instructions to allocate wide area network caching threads; and
program instructions to provide, by the parent partition, objects for prefetching by the multiple dependent partitions utilizing the allocated wide area network caching threads.

8. The computer program product of claim 7, wherein program instructions to create, by the parent partition, the heat map comprise program instructions to monitor, by the parent partition, the multiple dependent partitions.

9. The computer program product of claim 8, wherein program instructions to monitor, by the parent partition, the multiple dependent partitions comprises:
program instructions to log, by the parent partition, a number of objects within each dependent partition;
program instructions to log, by the parent partition, a number of times access is requested for each object; and
program instructions to prepare, by the parent partition, a list of objects in order of descending number of access requests, wherein the list of objects also specifies the dependent partition containing each object.

10. The computer program product of claim 8, wherein a first dependent partition, containing a first object with a number of access requests greater than a second object contained in a second dependent partition, is given a priority over the second dependent partition, and wherein a number of threads working per dependent partition is dependent on the priority given to the dependent partition.

11. The computer program product of claim 7, wherein program instructions to allocate the wide area network caching threads comprise an element from the group consisting of increasing the number of threads working per partition and decreasing the number of threads working per partition.

12. The computer program product of claim 7, further comprising:
program instructions to monitor individual partitions of the file based object storage architecture, the program instructions to monitor comprise:
program instructions to enable peer-to-peer communication;
program instructions to identify partitions that contain a maximum number of changes; and
program instructions to prepare a list of partitions in order of descending number of changes.

13. A computer system for optimizing a wide area network caching infrastructure in a file based object storage architecture, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, the program instructions comprising:
program instructions to create, by a parent partition, a heat map, wherein program instructions to create the heat map comprise determining a relationship between each partition of the file based object storage architecture based on a pattern of object recall per site per partition, and wherein each partition is wide area network caching enabled, and wherein the determined relationships identify the parent partition and the multiple dependent partitions;
program instructions to prioritize prefetching by multiple dependent partitions based on the heat map;
in response to prioritized prefetching by the multiple dependent partitions, program instructions to allocate wide area network caching threads; and
program instructions to provide, by the parent partition, objects for prefetching by the multiple dependent partitions utilizing the allocated wide area network caching threads.

14. The computer system of claim 13, wherein program instructions to create, by the parent partition, the heat map comprise program instructions to monitor, by the parent partition, the multiple dependent partitions.

15. The computer system of claim 14, wherein program instructions to monitor, by the parent partition, the multiple dependent partitions comprises:
program instructions to log, by the parent partition, a number of objects within each dependent partition;
program instructions to log, by the parent partition, a number of times access is requested for each object; and
program instructions to prepare, by the parent partition, a list of objects in order of descending number of access requests, wherein the list of objects also specifies the dependent partition containing each object.

16. The computer system of claim 14, wherein a first dependent partition, containing a first object with a number of access requests greater than a second object contained in a second dependent partition, is given a priority over the second dependent partition, and wherein a number of threads working per dependent partition is dependent on the priority given to the dependent partition.

17. The computer system of claim 13, further comprising:
program instructions to monitor individual partitions of the file based object storage architecture, the program instructions to monitor comprise:
program instructions to enable peer-to-peer communication;
program instructions to identify partitions that contain a maximum number of changes; and
program instructions to prepare a list of partitions in order of descending number of changes.

* * * * *